Jan. 24, 1939. J. SCHMID 2,145,057
PESSARY
Filed May 18, 1937
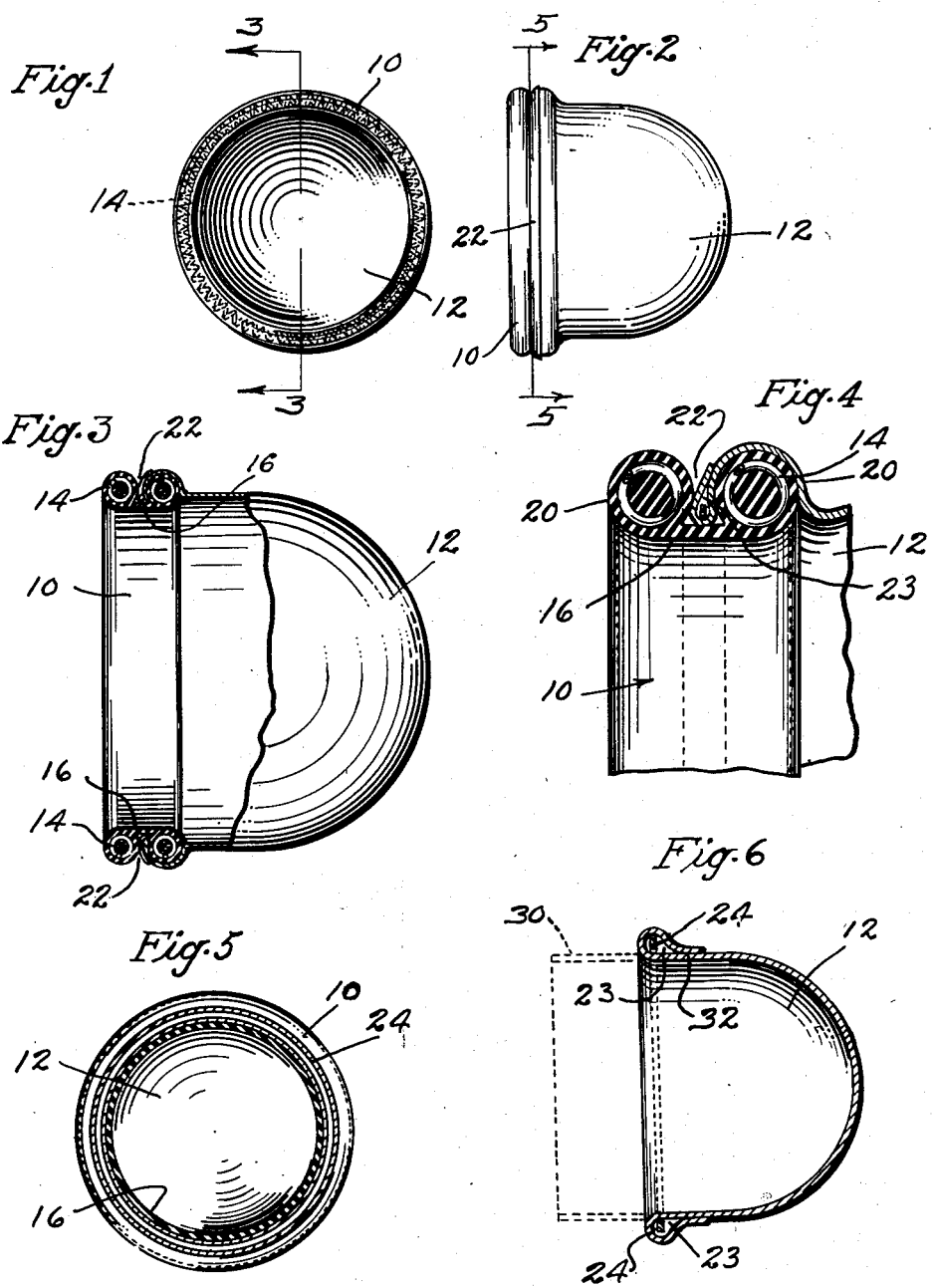
INVENTOR.
Julius Schmid
BY
Robt. F. Woolsey
ATTORNEY Patented Jan. 24, 1939

2,145,057

UNITED STATES PATENT OFFICE 2,145,057

PESSARY

Julius Schmid, Beverly Hills, Calif.

Application May 18, 1937, Serial No. 143,342

3 Claims. (Cl. 128—127)

As the title indicates, the device of the present invention relates to pessaries in general, however, specific effort has been made to develop a pessary wherein an annular structure of rubber having a groove upon its exterior face is adapted to receive and support a diaphragm formed of animal tissue.

The present invention contemplates the novel association of a plural number of rings of rubber, within each of which a closed length of extensile steel spring has been imbedded for the purpose of giving form to the pessary ring. By imbedding the steel springs in rubber, the user is protected against pain by reason of the insertion of the pessary, for all surfaces of the pessary are smooth and pliable to the sense of feeling.

It is accordingly a prime object of the present invention to provide a pessary wherein the ring thereof is formed of adjacent members which are joined by a web integral therewith upon their common inner faces, but leaving a parting line or an annular groove upon the outer face of the rings to receive a diaphragm formed of animal tissue which is formed with a loosely positioned stricture member in the free edge thereof.

Another object of the invention is to provide a pessary, the diaphragm of which may be discarded after it becomes useless as the result of wear, dishevelment, and/or for other cause which renders its further use undesirable, without necessarily discarding the supporting ring thereof.

A further object of the invention is to provide a pessary which is more efficient and more reliable, and in general, a more satisfactory device than has heretofore been possible.

Other objects, features and advantages of the invention may be apparent from the accompanying drawing, the specification, and the appended claims.

In the drawing of which there is one sheet:

Figure 1 is a front elevation of the device of this invention, showing the concave side thereof.

Figure 2 is a side elevation of the device of this invention.

Figure 3 is a view partially in side elevation and partially in section showing construction, the figure is taken on line 3—3, Figure 1.

Figure 4 is an enlarged sectional elevation of one section of the reinforced body portion showing the annular groove formed therein to receive the free edge of the pessary diaphragm and the floating stricture member located therein.

Figure 5 is a view taken on line 5—5, Figure 2, showing construction.

Figure 6 is a mid-longitudinal section of the pessary diaphragm showing how the free edge of the diaphragm is turned back to form an annular chamber within which an elastic stricture member is positioned.

The device of this invention, as shown in the drawing, comprises two divisions, i. e., the reinforced annular ring 10, and a sack 12, which while normally secured to the ring 10, is detachable therefrom.

The ring 10, as shown in the drawing, is formed with coiled steel springs 14 embedded in an annular structure of cured rubber. The coil springs 14 may be joined in any suitable manner to form a closed circular structure. They are then placed in molds which are formed in halves and which are additionally provided with a detachable insert used to give configuration to an annular groove in the finished product.

Liquid rubber is then injected into the molds to impregnate all of the interstices of the springs and to cover all of the exterior and interior surfaces thereof, thereby embedding the coil springs in a protective mat of rubber which protects the patient or user against harm or pain during insertion of the pessary. After liquid rubber has been injected into the molds to encase the springs, the molds are placed in a vulcanizing chamber wherein the springs and rubber are vulcanized to form a completed unit.

It is necessary that the molds not only receive the springs 14, but that provision be made so that not only the common inner faces of the rings, but that an appreciable amount of the sides of the rings be joined by a web of rubber after liquid rubber has been injected into the molds and the rubber has been cured or vulcanized, thereby forming in the completed device, a flat inner surface 16, which is in the nature of a web which joins the half rings of which the unit is composed. The sides 20 are of course molded to conform with the exterior shape of the springs 14, while the groove 22 is formed with sides that are relatively parallel with a plane which intersects the exterior sides of the ring, thus providing an annular recess within which the edge of the pessary diaphragm may be secured.

The sack or diaphragm 12 is formed of animal tissue, and is in fact formed from the caecum of the sheep. After removing the caecum, the tissue thereof is worked over by removing surplus thickness, and is then cut to form the closed cylindrical member or diaphragm 12.

After the caecum has been trimmed to obtain a proper degree of thinness and has been cut to obtain a proper length, an elastic band 24 is placed around the member, and the end 30 indicated by dotted lines in Figure 6, is folded back upon the sides of the member in the manner shown, thus providing an annular chamber within which the band or stricture member 24 may move by creepage to conform with changing condition of the diaphragm. The end 30 is cemented to the sides 32 of the diaphragm by the use of a cement or glue which is impervious to the action of water and which does not become hard or stiff when dry, thereby holding the end 30 in close engagement with the sides of the diaphragm, regardless of the physical condition of the pessary.

After the diaphragm 12 is completed it is slipped over the ring 10 so that the free edge of the diaphragm rests within the annular groove 22 as shown in the several figures of the drawing, particularly Figure 4. It is to be noted that tapered groove 22 readily permits movement to accommodate the free edge of the diaphragm, likewise the annular chamber 23 permits the stricture or band 24 such degree of freedom of movement as may be necessary due to the physical changes to which a diaphragm formed from the caecum are subjected when they are alternately wet and dry.

It will thus be apparent to those interested in the art to which the device of this invention belongs, that I have formed a new and novel type of pessary construction, wherein the supporting rings may be used indefinitely, in combination with new diaphragms, after the original diaphragm has become useless by reason of wear or other deterioration, for insofar as applicant has knowledge, and he has been identified with the business of developing prophylactic devices for many years, it has never heretofore been possible to unite an animal tissue in the manner shown and described whereby an annular chamber may be formed to receive a stricture member in floating relation to said chamber for the purpose of self-accommodation to varying physical conditions of the pessary so formed.

The foregoing specification and the attached drawing represent the preferred form of construction employed to obtain the purpose of this invention, however, if there be other methods of construction which clearly fall within the scope of the present invention, applicant believes that he is entitled thereto, and presents the following claims which are representative of the invention herein.

I claim:

1. A pessary comprising a supporting ring and a diaphragm in detachable relation thereto, said ring being formed of separate coil springs imbedded in soft rubber, a web joining said springs and their encasement on the inner face thereof whereby an annular groove is formed between said springs upon the exterior face of said ring, said diaphragm being formed of animal tissue, an annular chamber in the free edge of said diaphragm, a stricture device loosely positioned within said chamber whereby said device may be self adjusted within said chamber, said stricture device being adapted to hold the edge of said diaphragm within said annular groove.

2. A supporting ring for a pessary diaphragm detachable therefrom, said ring comprising separate coil springs, an encasement of soft rubber surrounding each of said springs, a web of rubber joining said encasements on the inner faces thereof, said web joining said encasements and springs in a monolithic structure.

3. A supporting ring for a pessary diaphragm detachable therefrom, said ring comprising separate springs of coiled steel adjacent one another and in parallel planes, an encasement of soft rubber surrounding each of said springs, a web of rubber joining said encasements on the inner face thereof, said springs and encasements, when joined by said web, forming an annular groove therebetween and upon the exterior side thereof.

JULIUS SCHMID.